UNITED STATES PATENT OFFICE.

MILLER EUGENE CONRAD, OF ATLANTIC, IOWA.

VOLTAIC CELL.

SPECIFICATION forming part of Letters Patent No. 719,752, dated February 3, 1903.

Application filed December 18, 1900. Serial No. 40,235. (No model.)

*To all whom it may concern:*

Be it known that I, MILLER EUGENE CONRAD, a citizen of the United States, residing at Atlantic, in the county of Cass and State of Iowa, have invented certain new and useful Improvements in Voltaic Cells, of which the following is a specification.

This invention relates to voltaic cells, and especially to an improved depolarizing cell and an improved negative plate therefor, whereby the useful life of the cell is prolonged and its electromotive force increased.

The accumulation of hydrogen-bubbles on the surface of the negative plate of a voltaic cell, known as "polarization," is doubly objectionable. It results in a diminution of the current, first, by diminishing the exposed area of the negative plate and so increasing the internal resistance of the cell, and, second, by its tendency to set up a "polarization-current" in the direction opposite to that of the cell, the hydrogen being more positive than the zinc or other positive plate.

In the cell of my invention polarization is prevented by the conversion of the hydrogen of polarization into sulfureted hydrogen gas, ($H_2S$.) This action is most conveniently effected by using as a negative plate a sulfid of one of the metals. The nascent hydrogen coming into contact with the sulfid readily unites with the sulfur to form $H_2S$, which is immediately driven off. Of the various sulfids with which I have experimented (sulfids of iron, copper, lead, and others) the sulfid of iron is superior in working entirely clean, giving a strong current, and being cheap.

In making my non-polarizing plate of a sulfid of iron I may use native iron pyrites ($FeS_2$) or a sulfid artificially made from a carbonate or oxid of iron. The method of obtaining the sulfid which I have found most satisfactory consists in placing the red oxid of iron, ($Fe_2O_3$,) either pure or in the form of red iron ore (hematite) or iron-rust, with a suitable proportion of sulfur, in a crucible and heating. The resulting sulfid would be $Fe_2OS$, $Fe_2O_2S$, or $Fe_2O_3S$. As regards any chemical reaction in the cell, it appears to be immaterial how many equivalents of oxygen are retained in the sulfid, as the oxygen does not seem to be separated during voltaic action. It is more than likely that one or even two equivalents of oxygen are driven off in union with sulfur during the formation of the sulfid, so that hereinafter I write it $Fe_2OS$. These several compounds are collectively designated as "oxysulfids," by which term it is intended to cover any sulfid in which any part of the sulfur is replaced by oxygen. Owing, probably, to the impurities of the native sulfid, the artificial sulfid gives the stronger and more lasting current.

My improved non-polarizing element may be used with advantage in connection with any of the electrolytes now in use in primary cells. For example, I have found it to give good results with each of the following: Potassium hydroxid, (KHO); sodium hydroxid, (NaHO); sodium chlorid, (NaCl); alum, ($Al_2SO_4$, $_3+K_2SO_4+24H_2O$); sodium sulfite, ($Na_2SO_3$); ferrous sulfate, ($FeSO_4$); potassium nitrate, ($KNO_3$); bichromate of potash, ($K_2Cr_2O_7$); zinc sulfate, ($ZnSO_4$); Epsom salt, ($MgSO_4+7H_2O$); sodium sulfate, ($Na_2SO_4+10H_2O$); magnesium and zinc sulfates, ($MgSO_4+7H_2O+ZnSO_4$); perchlorid of iron, ($FeCl_3$); sodium sulfate and potassium hydroxid, ($Na_2SO_4+10H_2O+KHO$).

The best results are obtained by the use of zinc and sulfid of iron elements and dilute $H_2SO_4$, KHO, or NaHO as the electrolyte. Using KHO as the electrolyte, the reactions which occur are as follows:

(1) 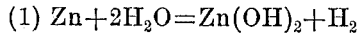 $Zn+2H_2O=Zn(OH)_2+H_2$ (2) 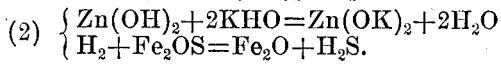 $\begin{cases} Zn(OH)_2+2KHO=Zn(OK)_2+2H_2O \\ H_2+Fe_2OS=Fe_2O+H_2S. \end{cases}$ That is to say, first, the water is decomposed and combines with the zinc to form zinc hydroxid and hydrogen, and, second, the zinc hydroxid combines with the potassium hydroxid to form alkaline zincate (zincate of potassium) and water, while the hydrogen combines with the iron sulfid to form an oxid of iron and sulfureted hydrogen gas. The reactions are quite similar in the use of other electrolytes. The H in its nascent state combines at once with the sulfur of the negative element to form $H_2S$. The cell is thus continually depolarized, so as to give a constant current.

In my improved cell the formation of $H_2S$ is not against the electromotive force of the cell, but, on the contrary, is in the same direction, and consequently tends to make the electromotive force greater than that in the copper-oxid cell known as the "Edison-Lalande." No perceptible local action exists. It also works more cleanly than the average cell in use. A valuable feature of the invention is the fact that the sulfid plate may be renewed by again treating it with sulfur as often as its previous supply of sulfur is exhausted without noticeable deterioration.

My invention is not limited to any or to all of the applications herein described.

The depolarizing element may be in any suitable shape—such as a plate, rod, cylinder, or vessel—or it may be held in any suitable container.

One advantage of the treatment of iron oxid with sulfur, as above described, is that after such treatment it is affected by a magnet and becomes a better conductor of electricity, thus lessening the internal resistance of the cell. This is true, even though I use the non-magnetic oxid, which is originally a non-conductor and uninfluenced by an ordinary magnet. The conductivity of the sulfids of copper, iron, and lead prepared according to my specification is appreciably increased over that of the corresponding oxid.

I claim as my invention, and desire to secure by Letters Patent, the following-defined novel features, substantially as set forth:

1. In a voltaic cell, the combination of positive and negative electrodes, an electrolyte, and means for depolarizing the cell consisting of a metallic oxysulfid, said oxysulfid being in contact with the negative electrode so as to combine with the hydrogen of polarization to form sulfureted hydrogen.

2. In a voltaic cell, the combination of positive and negative electrodes, an electrolyte, and means for depolarizing the cell consisting of an oxysulfid of iron, said oxysulfid being in contact with the negative electrode so as to combine with the hydrogen of polarization to form sulfureted hydrogen.

3. A negative electrode for use in a voltaic cell, composed of a metallic oxysulfid.

4. A negative electrode for use in a voltaic cell, composed of an oxysulfid of iron.

5. The combination in a voltaic cell, of a receptacle for the electrolyte, a positive element, and a negative element composed of a metallic oxysulfid.

6. The combination in a voltaic cell, of a receptacle for the electrolyte, a positive element, and a negative element composed of an oxysulfid of iron.

In witness whereof I have hereunto signed my name in the presence of two subscribing witnesses.

MILLER EUGENE CONRAD.

Witnesses:
FRANK C. VREDENBURGH,
ORSON M. HOBART.